Sept. 28, 1954 W. F. MOORE 2,690,033
FEED CONTROL FOR GRINDING MACHINES
Filed Feb. 23, 1952 5 Sheets-Sheet 1
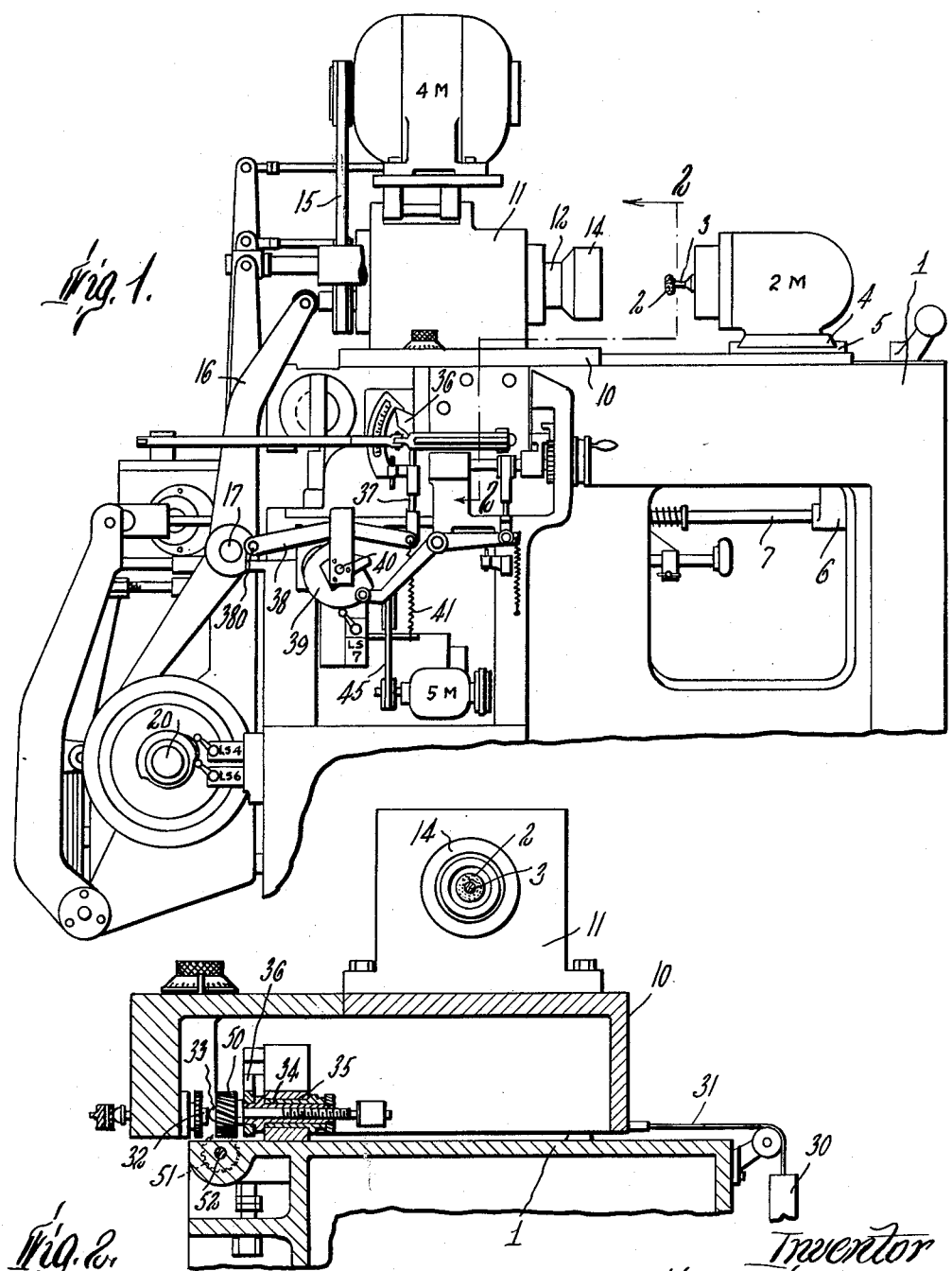

Sept. 28, 1954 W. F. MOORE 2,690,033
FEED CONTROL FOR GRINDING MACHINES
Filed Feb. 23, 1952 5 Sheets-Sheet 2

Inventor
Willis F. Moore

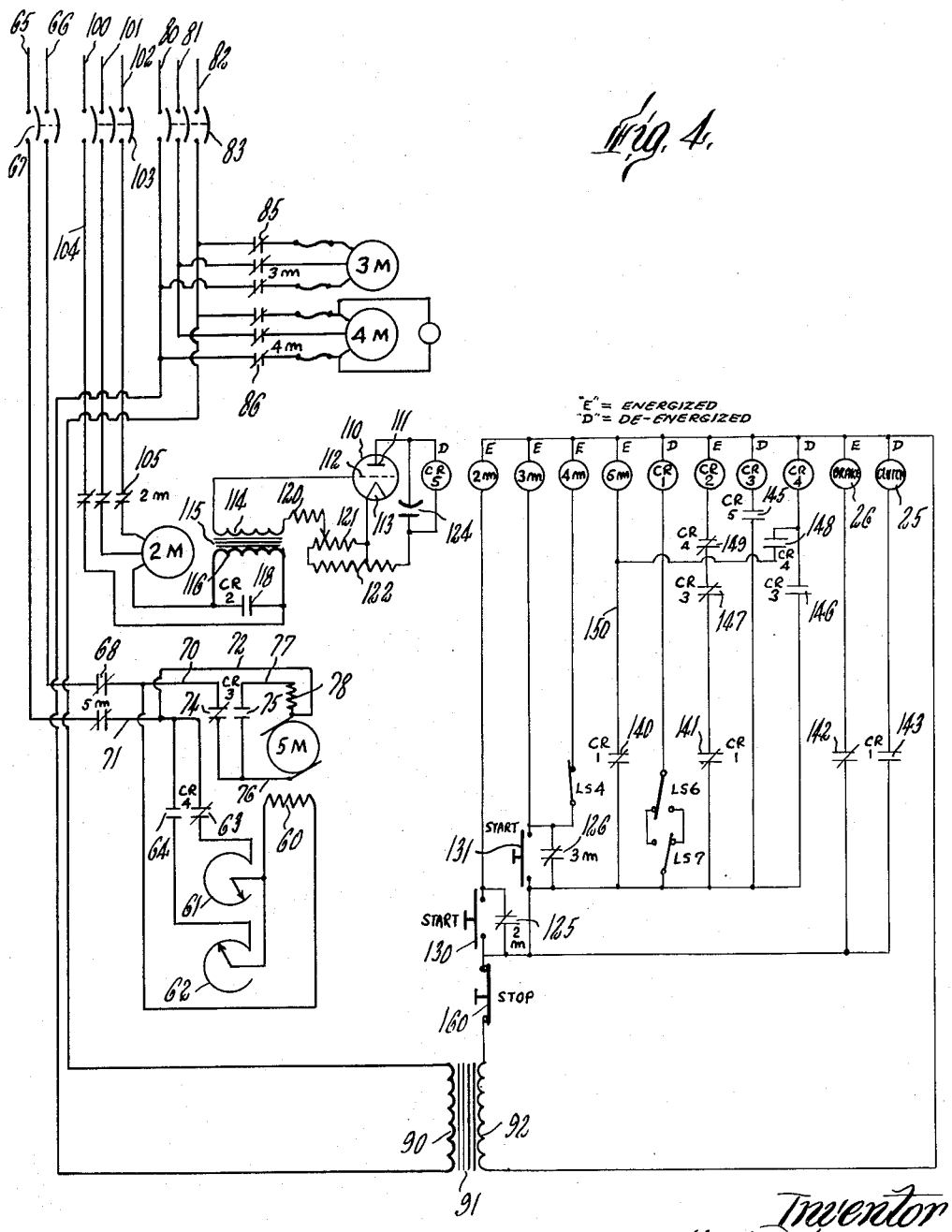

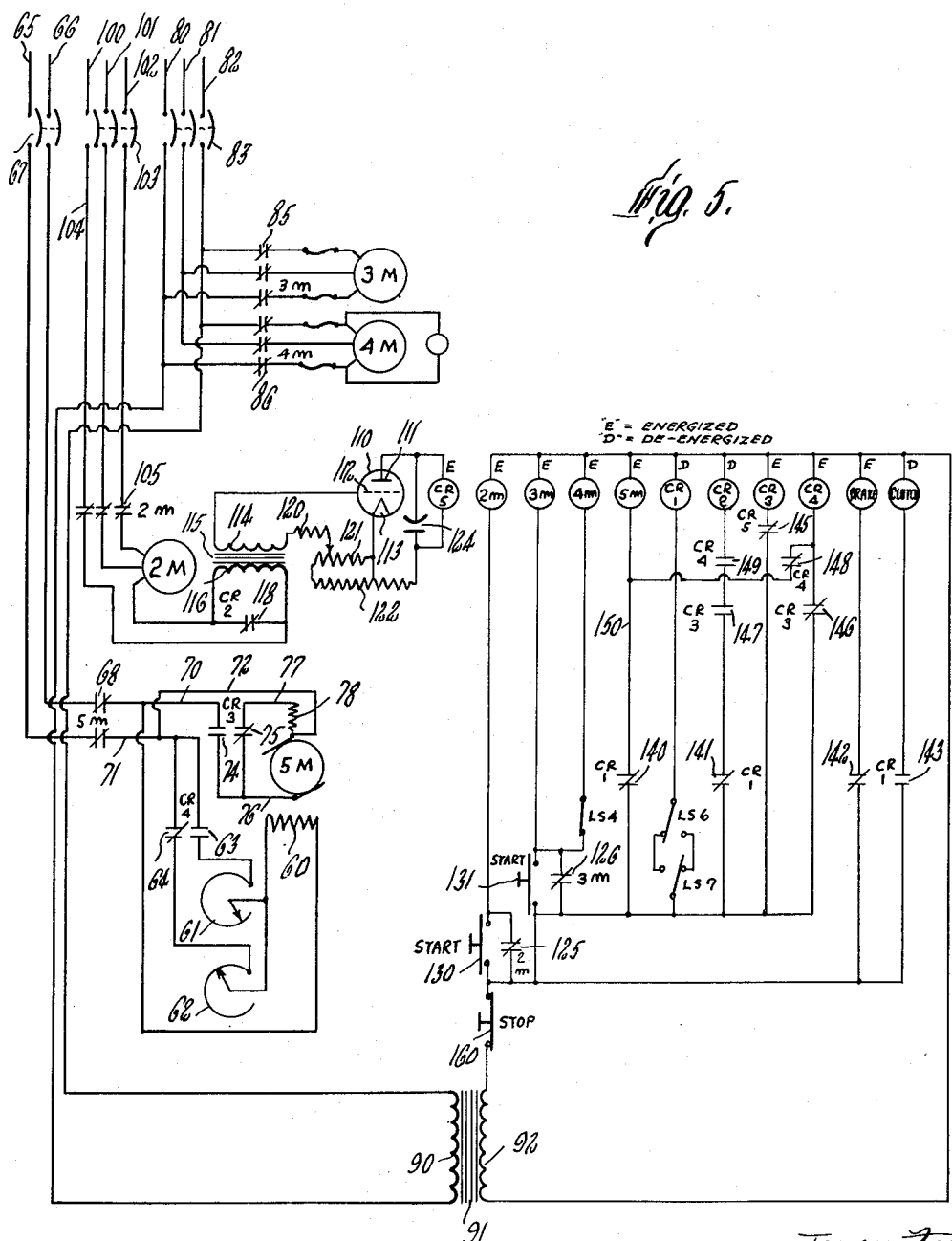

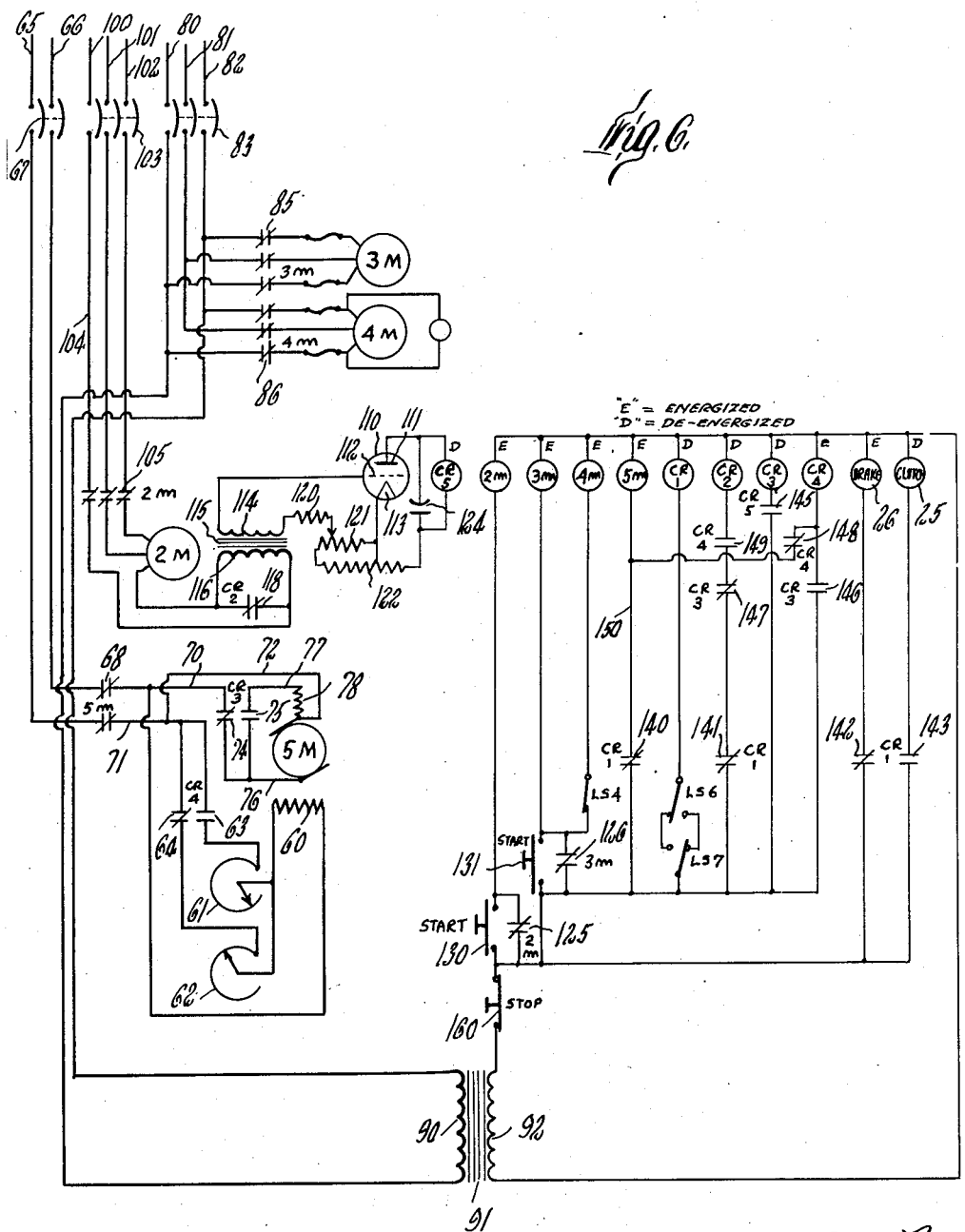

Patented Sept. 28, 1954

2,690,033

UNITED STATES PATENT OFFICE 2,690,033

FEED CONTROL FOR GRINDING MACHINES

Willis F. Moore, Springfield, Vt., assignor to Bryant Chucking Grinder Company, Springfield, Vt., a corporation of Vermont Application February 23, 1952, Serial No. 272,921

6 Claims. (Cl. 51—50)

This invention relates to the control of the feed of a grinding wheel with respect to work.

It is customary at the end of a grinding operation to effect a relative retracting motion between the work and the grinding wheel which separates these parts a substantial distance in order that the finished work may be removed and replaced by a piece to be ground without interference by the grinding wheel. At the start of the next operation, it is necessary first to bring the wheel and the work into contact before any grinding can be effected, and as the time required to do this is not productive, it is desirable to make it as short as possible. This calls for an initial relatively quick approach feed motion between the wheel and the work much more rapid than is suitable during the grinding operation, and since the exact relative positions of wheel and work axes when contact between the wheel and the work takes place varies with different work pieces and with different wheel diameters, the exact time at which the feed speed should be reduced is quite impossible to accurately predetermine. If the speed be reduced at the same point expected to be safe for all work pieces, it will be more or less early for most and time will be wasted during an idle slow feed while the wheel merely grinds air. If the feed rate is not reduced quickly enough at any time, the wheel crashes into the work at the fast idle speed with possible damage to the wheel, work, or machine, and danger to the operator.

In accordance with the present invention the slow feed is initiated by the increased load on the grinding wheel drive, the instant the wheel contacts with the work. Thus the time of the initiation of the slow feed is dependent upon the initial size of the work piece to be ground and the wheel diameter, and the rapid idle feed required to bring the wheel and the work from retracted position to active relation is maintained as long as the feed continues idle and while it is safe to continue it.

In accordance with the present invention, this change from fast idle feed to slow working feed is produced by the additional load on the wheel drive caused by the wheel contacting the work, and in accordance with this invention the sensitivity of the response to increased wheel load is so great that accurate and instant reduction of speed is effected at precisely the time desired.

For a more complete understanding of this invention, reference may be had to the accompanying drawings in which:

Figure 1 is a fragmentary front elevation of a grinding machine embodying the invention.

Figure 2 is a detail sectional view on line 2—2 of Figure 1.

Figure 3:
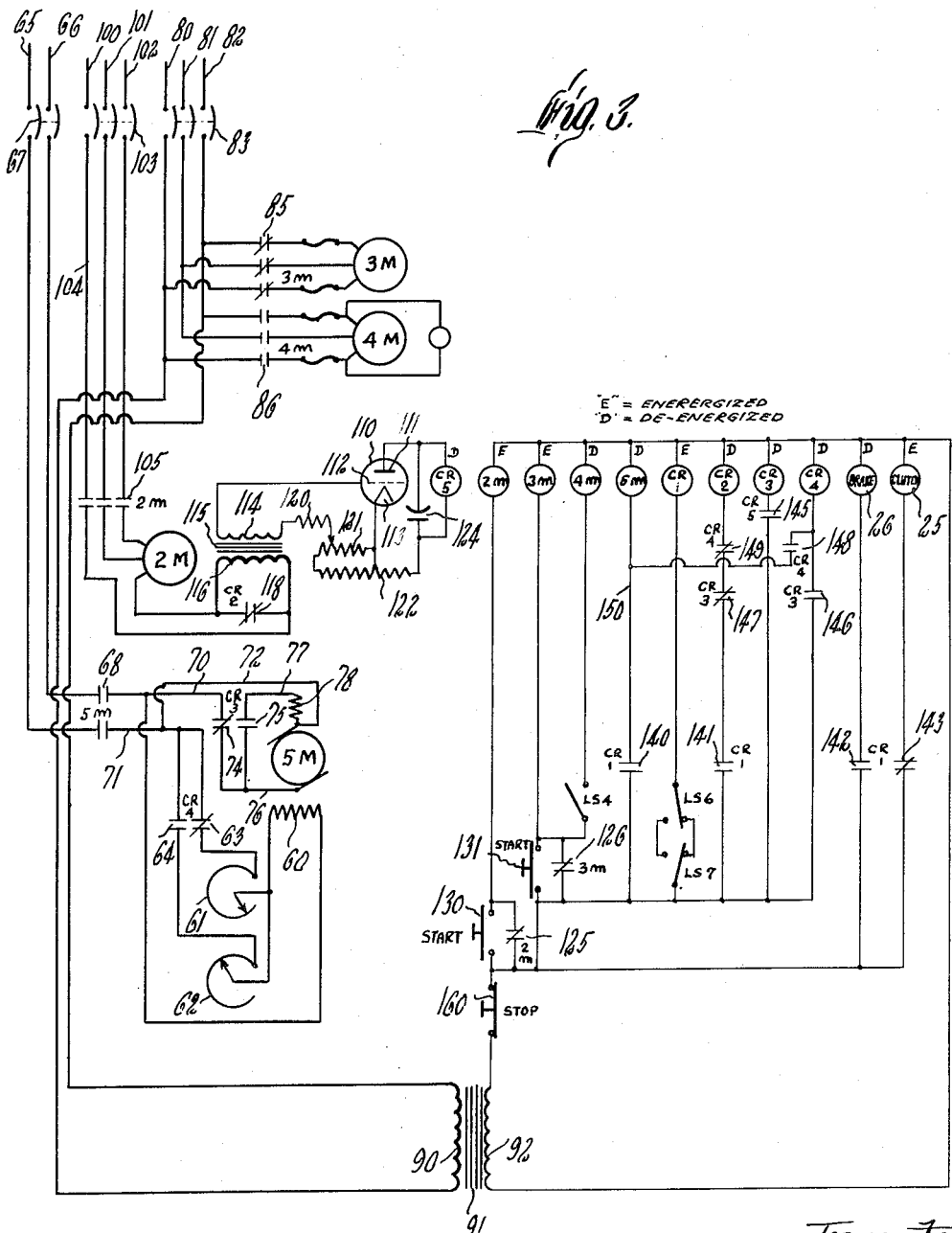

Figures 3 to 6, inclusive, are fragmentary simplified wiring diagrams showing the controls governing the relative motion between the grinding wheel and work in successive portions of the cycle.

The invention is shown as applied to a grinding machine of the type illustrated and described in patent to Grobey, No. 2,677,921, dated May 11, 1954, a portion of this machine sufficient for an understanding of the present invention being shown in Figures 1 and 2.

Referring to these figures, at 1 is shown the bed of a machine on which is mounted a grinding wheel at 2. This wheel 2 is carried by a shaft 3 of a high frequency motor 2M which is supported for adjustment with reference to the work on a slide 4 carried on a carriage 5 movably mounted on the bed 1. This carriage 5 is mounted for motion generally lengthwise of the shaft 3 and is provided with a depending arm 6 to which is attached a rod 7 by which it may be moved.

A work holding carriage 10 (see Figure 2) is mounted on the bed 1 for motion in the feed direction transverse to the axis of the work spindle 12 which causes the grinding wheel and the work piece to approach each other during the grinding operation and to feed the wheel into the work after the initial idle feed necessary to bring the wheel and the work into contact has been accomplished. It will be noted that this direction of motion is at right angles to the motion which brings the wheel into or away from transverse alinement with the work. This carriage 10 carries a spindle mounting 11 within which is journalled the work spindle 12 carrying a work-holding chuck 14.

This work spindle is arranged to be rotated through a belt 15 by a motor 4M shown in Figure 1 and in the diagrams of Figures 3 to 6 and the chuck 14 may be opened or closed to release or clamp a work piece through the swinging of a lever 16 mounted on a fulcrum shaft 17 and actuated by a suitable cam (not shown) on a cam shaft 20. This cam shaft 20 also carries various other cams for producing other functions during the cycle of the machine but with which the present invention is not concerned. The cam shaft 20 is rotated by a motor 3M shown in the diagrams of Figures 3 to 6, inclusive, and is connected to the cam shaft 20 through a clutch 25 shown in the diagrams and its motion is automatically stopped by a brake 26 when the clutch is opened, all in the well known manner, both the clutch and brake being electrically actuated, the clutch to be closed when energized, and the brake to be applied when energized.

The work carriage 10 is held in contact with the feed actuating mechanism by a weight 30 (see Figure 2) connected thereto through a flexible cord 31, the limit of such motion being determined by the engagement of an abutment 32 carried by the carriage 10 with the end of a feed screw 33 which is threaded into a sleeve 34 mounted in a bearing 35 fixed to the base 1. Connected to the sleeve 34 is an arm 36 to which is attached a link 37 (see Figure 1) carried by the end of an arm 38. This arm 38 is fulcrumed at 380 and carries a suitable follower riding upon the edge of a cam 39 fixed to a cam shaft 40. The arrangement is such that as the cam shaft 40 rotates, the cam raises the arm 38, rocks the arm 36 upwardly, thereby actuating the feed screw 33 moving the carriage 10 in feed direction, or in other words in a direction that will bring the grinding wheel into contact with the work piece. The cam 39 is so shaped that after a predetermined amount of feed, it allows the arm 38 to be dropped by gravity and a spring 41, lowering the arm 36 and turning the sleeve 34 in a direction to retract the carriage 10. The cam shaft 40 is rotated by a motor 5M through a belt connection 45. The rotation of the cam shaft 40 is the part controlled to effect the rapid approach between the wheel and the work piece followed by the slow cutting feed and then the retraction, and is the portion of the cycle of the machine to which this invention is particularly related. As shown in the patent before mentioned, a cam on the cam shaft 20 also operates to move the grinding wheel between its retracted and active axial relation to the work piece.

The feed screw 33 also carries a gear 50 with which meshes a similar gear 51 on a shaft 52, this providing for an additional feed motion between the wheel and the work which compensates for wheel wear and truing. However, this mechanism forms no part of the present invention and need not be further described herein.

The cam shaft 20 carries a pair of cams which control the positions of two electric switches LS4 and LS6 and a cam on the cam shaft 40 also controls the position of a switch LS7.

As shown in the diagrams of Figures 3 to 6, the feed motor 5M is a direct current motor having a field 60 which may derive its energization selectively through either of a pair of rheostats 61, 62 determined by the opening or closing of a pair of CR4 switches 63, 64. When the switch 63 is closed and the switch 64 opened, the rheostat 61 is interposed in the field circuit and weakens this field so that the motor 5M runs at a relatively high rate of speed, this being accomplished during the quick approach between the wheel and the work piece. When the switch 63 is open and the switch 64 is closed, the rheostat 62 is interposed in the field circuit and the motor 5M runs at a relatively slow rate of speed, the field now being relatively strong. This motor 5M is energized from the D. C. lines 65 and 66 through the usual master switch at 67. The motor 5M is controlled through the two 5m switches shown at 68 in opposite sides of the circuit and both controlled together. The armature receives its current from these switches through the leads 70 and 71, the lead 71 connecting directly to one side of the armature through the lead 72 and the lead 70 connecting selectively through the two CR3 switches 74 and 75, the switch 74 connecting through the lead 76 and the switch 75 connecting through the lead 77 and the dynamic brake coil 78 with the lead 72. Thus when the CR3 switch 74 is closed and the switch 75 is open, the armature of the motor 5M is in the circuit and the motor is running, while when the switch 74 is open and the switch 75 is closed, the armature circuit is closed through the dynamic brake 78 and the motor acts as a generator to slow down its own rotation.

The motor 3M which drives the cam shaft 20 through the clutch 25 and the work-rotating motor 4M which rotates the work spindle derive their energy from the three-phase lines 80, 81 and 82 through the main control switch 83 and through the control switches 3m and 4m in each phase for the motors 3M and 4M, respectively. The three phase lines 80 and 82 are also shown as connected to the primary 90 of a transformer 91, the secondary 92 of which supplies low voltage power for actuating various relays, as will later be explained.

The motor 2M derives its power from the high frequency lines 100, 101, 102 through the main control switch at 103 and the local three phase 2m switches shown at 105. In the circuit of one of these phases is an electronic mechanism which comprises the electron tube 110 having a plate 111, a controlling grid 112, and a cathode 113. This tube derives its excitation through the secondary 114 of a transformer 115, the primary 116 of which is arranged in series with one of the phase leads at 104 of the motor 2M, but which may be short circuited by closing of a CR2 switch at 118. The grid 112 is connected to one side of the secondary 114 and the cathode is connected to the other side of this secondary through a resistor 120 and an adjustable resistor 121. The plate 111 derives potential from the same side of the transformer secondary 114 through resistors 122 and 121 and through a CR5 relay which is bridged by a condenser 124. The cathode is also connected to an intermediate point of the resistor 122. With this arrangement of the parts, and with proper adjustment of the resistor 121 and assuming that the CR2 switch 118 is open, a current flows through the primary of the transformer 115 and a biasing potential is impressed upon the grid 112. This biasing potential is so arranged that during the idle rotation of the grinding wheel it is insufficient to open the tube 110, but when the load on the wheel is increased, as when the wheel contacts the surface of the work, the current is stepped up through the transformer and the biasing voltage is raised sufficiently to open the tube 110 and to energize the relay CR5. As will later appear, the energization of this relay is caused to slow down the feed rate from the fast approach to the normal grinding feed.

Figure 3 illustrates the parts in loading position, that is, when the work spindle is stopped for loading and replacement of a work piece and the wheel is in retracted position. At this time, assuming that the two start buttons 130 and 131 have been depressed, energizing the two relays 2m and 3m and closing the 2m and 3m switches 105 and 85 by which the cam shaft motor 3M has been set into operation and the wheel motor 2M has been energized, these motors continuing in operation after the pressing of the start buttons by the closing of their holding switches 2m and 3m at 125 and 126 shown in the diagram, and the cam shaft 20 being rotated by its driving means through the closed clutch 25, the brake 26 being released, rotation of the cam shaft 20 starts. This first closes the switch LS4, this being open during the loading operation.

The closing of the switch LS4, as shown in Figure 4, energizes the relay 4m which closes 4m switch mechanism at 86 and starts the rotation of the work spindle. The rotation of the cam shaft 20 also moves the switch LS6 from the position shown in Figure 3 where it energized the relay CR1 to the position shown in Figure 4 and deenergizes the CR1 relay. Opening of the relay CR1 closes the three CR1 switches at 140, 141, and 142 and opens the CR1 switch at 143. Closing of the CR1 switch 140 energizes the relay 5m which closes the 5m switches 68 and starts rotation of the motor 5M which then rotates at fast idle feed speed, bringing the work up toward the grinding wheel by the action of cam 39. The closing of the CR1 switch 141 energizes the relay CR2 which opens the CR2 switch at 118, causing energization of the transformer 115 by which energy is supplied to the electron tube 110. The opening of the CR1 switch at 143 opens the clutch 25, disconnecting the cam shaft 20 from its motor 3M, and the closing of the CR1 switch 142 applies the brake 26 to stop the rotation of this cam shaft. This action continues until the load on the grinding wheel is increased by its contact with the work, whereupon the electron tube passes plate current through the relay CR5 to actuate this relay which makes the changes indicated in Figure 5.

Energizing of the relay CR5 as shown in Figure 5 closes the CR5 switch at 145 and energizes the relay CR3. This opens the CR3 switch at 74 in the armature circuit of the feed motor 5M and closes the CR3 switch 75 which interposes the brake 78 in the armature circuit of motor 5M, thus slowing the rotation of the feed motor 5M by dynamic braking. Energizing the relay CR3 also closes the CR3 switch 146. Closing of the switch 146 energizes the relay CR4 which closes the CR4 switch at 148 and opens the CR4 switch at 149. Opening of the CR3 switch 147 deenergizes the relay CR2 which closes the CR2 switch at 118 and short circuits the transformer primary 116, deenergizing the electronic circuit. The CR4 relay now continues to be energized by the closed CR4 switch 148 which leads to the supply lead 150 and so remains as long as the CR1 switch at 140 remains closed (see Figure 6). The energization of the CR4 relay also opens the CR4 switch 63 and closes the CR4 switch 64 in the field of the feed motor 5M which cuts out the field resistance 61 and cuts in the field resistance 62 so that the feed motor 5 now operates at the low feed speed. This continues until the end of the feed which allows the feed arm 36 to retract, after which the switch LS7 is actuated by the continued rotation of the feed shaft 40, moving the switch LS7 to its opposite position, deenergizing the CR1 relay and returning the parts to load condition of Figure 3.

At any time, depression of the stop button at 160 will deenergize the entire control circuit and stop the machine operation.

From the foregoing description it will be evident to those skilled in the art that various changes and modifications may be made without departing from the spirit or scope of the invention.

I claim:

1. A grinding machine having parts comprising a work holder and a grinding wheel, means supporting said holder and wheel for rotation and for relative feed and retracting motions, an electric motor operatively connected thereto for rotating said wheel, a grid controlled electronic tube, a transformer having a winding in series with said wheel driving electric motor, a resistor in series with the other winding of said transformer, and a connection from the other terminal of said transformer from said resistor to said grid whereby grid potential is responsive to the current flow to said wheel driving electric motor, said tube being arranged to pass no current when said wheel is running idle and to pass current when said wheel has load thereon, means operatively connected to one of said parts for moving said parts relatively and when in feeding direction selectively at a fast idle speed or a slow grinding speed, means operatively connected to said moving means controlling selectively the speed of feeding motion, means operatively connected to said controlling means for setting said controlling means to produce feed at the higher speed from a retracted position, and means responsive to the passing of current by said tube to select the slower feed speed.

2. A grinding machine having parts comprising a work holder and a grinding wheel, means supporting said holder and wheel for rotation and for relative feed and retracting motions, an electric motor operatively connected thereto for rotating said wheel, a grid controlled electronic tube, a transformer having a winding in series with said wheel driving electric motor, a resistor in series with the other winding of said transformer, and a connection from the other terminal of said transformer from said resistor to said grid whereby grid potential is responsive to the current flow to said wheel driving electric motor, said tube being arranged to pass no current when said wheel is running idle and to pass current when said wheel has load thereon, means operatively connected to one of said parts for moving said parts relatively and when in feeding direction selectively at a fast idle speed or a slow grinding speed, means operatively connected to said moving means controlling selectively the speed of feeding motion, means operatively connected to said controlling means for setting said controlling means to produce feed at the higher speed from a retracted position, means responsive to the passing of current by said tube to select the slower feed speed, means responsive to a predetermined feed position between said wheel and work holder to relatively retract said wheel and holder, and means automatically effective after such retraction to stop said moving means.

3. A grinding machine having parts comprising a work holder and a grinding wheel, means supporting said grinding wheel for rotation and said wheel and work holder for relative motions to feed and retract said wheel relative to work carried by said work holder, an electric motor operatively connected to one of said parts for effecting such feed motion, an actuating circuit for said motor, a pair of speed controlling devices for said electric motor selectively interposed in said actuating circuit, means normally interposing said high speed control in said circuit, a second motor operatively connected to rotate said grinding wheel, a grid controlled electron tube having its grid potential responsive to the current flow to said second electric motor and arranged to pass no current when said wheel is running idle and to pass current when said wheel has load thereon, and means responsive to passing of current by said tube to cut out said high speed control and to cut in said low speed control to thereby slow the speed of said first mentioned motor.

4. A grinding machine having parts comprising a work holder and a grinding wheel, means supporting said grinding wheel for rotation and said wheel and work holder for relative motions to feed and retract said wheel relative to work carried by said work holder, an electric motor operatively connected to one of said parts for effecting such feed motion, an actuating circuit for said motor, a pair of speed controlling devices for said electric motor selectively interposed in said actuating circuit, means normally interposing said high speed control in said circuit, a second motor operatively connnected to rotate said grinding wheel, a grid controlled electron tube having its grid potential responsive to the current flow to said second electric motor and arranged to pass no current when said wheel is running idle and to pass current when said wheel has load thereon, and means responsive to passing of current by said tube to cut out said high speed control, effect dynamic braking of said first mentioned motor and then to cut in said low speed control to thereby slow the speed of said first mentioned motor.

5. A grinding machine having parts comprising a work holder and a grinding wheel, means supporting said grinding wheel for rotation and said wheel and work holder for relative motions to feed and retract said wheel relative to work carried by said work holder, an electric motor operatively connected to one of said parts for effecting such feed motion, an actuating circuit for said motor, a pair of speed controlling devices for said electric motor selectively interposed in said actuating circuit, means normally interposing said high speed control in said circuit, a second motor operatively connected to rotate said grinding wheel, a grid controlled electron tube having its grid potential responsive to the current flow to said second electric motor and arranged to pass no current when said wheel is running idle and to pass current when said wheel has load thereon, and means responsive to passing of current by said tube to cut out said high speed control and to cut in said low speed control to thereby slow the speed of said first mentioned motor and then to deenergize said electron tube.

6. A grinding machine having parts comprising a work holder and a grinding wheel, means supporting said grinding wheel for rotation and said wheel and work holder for relative motions to feed and retract said wheel relative to work carried by said work holder, an electric motor operatively connected to one of said parts for effecting such feed motion, an actuating circuit for said motor, a pair of speed controlling devices for said electric motor selectively interposed in said actuating circuit, means normally interposing said high speed control in said circuit, a second motor operatively connected to rotate said grinding wheel, a grid controlled electron tube having its grid potential responsive to the current flow to said second electric motor and arranged to pass no current when said wheel is running idle and to pass current when said wheel has load thereon, and means responsive to passing of current by said tube to cut out said high speed control, effect dynamic braking of said first mentioned motor and then to cut in said low speed control to thereby slow the speed of said first mentioned motor and then to deenergize said electron tube.

References Cited in the file of this patent

UNITED STATES PATENTS

| Number | Name | Date |
|---|---|---|
| 1,717,326 | Shaw et al. | June 11, 1929 |
| 2,129,049 | Doran | Sept. 6, 1938 |
| 2,334,581 | Pyne | Nov. 16, 1943 |
| 2,476,851 | Folsom | July 19, 1949 |

FOREIGN PATENTS

| Number | Country | Date |
|---|---|---|
| 363,544 | Great Britain | Dec. 24, 1931 |
| 391,479 | Great Britain | Apr. 20, 1933 |